United States Patent
Schiattarella et al.

(10) Patent No.: US 10,944,576 B2
(45) Date of Patent: Mar. 9, 2021

(54) AUTHORIZATION WITH A PRELOADED CERTIFICATE

(71) Applicant: Pensando Systems Inc., San Jose, CA (US)

(72) Inventors: Enrico Schiattarella, Los Altos, CA (US); Vipin Jain, San Jose, CA (US); Ravi Kumar Gadde, Los Altos, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 0 days.

(21) Appl. No.: 16/173,441

(22) Filed: Oct. 29, 2018

(65) Prior Publication Data

US 2020/0136836 A1 Apr. 30, 2020

(51) Int. Cl.
| | | |
|---|---|---|
| *H04L 9/32* | (2006.01) | |
| *G06F 21/33* | (2013.01) | |
| *H04L 29/06* | (2006.01) | |
| *H04L 29/00* | (2006.01) | |
| *H04L 9/00* | (2006.01) | |

(52) U.S. Cl.
CPC .......... *H04L 9/3265* (2013.01); *G06F 21/335* (2013.01); *H04L 9/006* (2013.01); *H04L 9/321* (2013.01); *H04L 9/3247* (2013.01); *H04L 63/102* (2013.01); *H04L 63/12* (2013.01); *H04L 63/20* (2013.01); *G06F 2221/2115* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 6,212,634 B1 | 4/2001 | Geer, Jr. et al. | |
| 8,407,464 B2* | 3/2013 | Salowey | H04L 9/321 713/156 |
| 8,413,238 B1 | 4/2013 | Sutton | |
| 9,143,504 B1* | 9/2015 | Shi | H04L 63/0823 |

(Continued)

FOREIGN PATENT DOCUMENTS

| | | |
|---|---|---|
| WO | WO-2019133434 A1 | 7/2019 |
| WO | WO-2020092225 A1 | 5/2020 |

OTHER PUBLICATIONS

PCT/US2018/066801 International Search Report and Written Opinion dated Apr. 2, 2019.

(Continued)

*Primary Examiner* — Joseph P Hirl
*Assistant Examiner* — Hassan Saadoun
(74) *Attorney, Agent, or Firm* — Wilson Sonsini Goodrich & Rosati (57) ABSTRACT

An authorization method using provisioned certificates is disclosed. The method includes writing security attributes to fields within a certificate and issuing the certificate to a software application on a principal node. The software application requests to perform actions on one or more resources on a resource node, sending one or more action requests along with a copy of its certificate. The resource node has an agent which verifies the permissions from the certificate and routes the request to its designated resource. The resource node returns one or more messages to the principal node, verifying whether or not complete the requests.

20 Claims, 5 Drawing Sheets

(56) References Cited

U.S. PATENT DOCUMENTS

| | | |
|---|---|---|
| 9,479,338 B2 | 10/2016 | Sabin |
| 2002/0065828 A1 | 5/2002 | Goodspeed |
| 2002/0144108 A1* | 10/2002 | Benantar ............... H04L 63/126 |
| | | 713/156 |
| 2007/0261112 A1 | 11/2007 | Todd et al. |
| 2009/0198689 A1 | 8/2009 | Frazier et al. |
| 2010/0131646 A1 | 5/2010 | Drako |
| 2010/0306816 A1 | 12/2010 | McGrew et al. |
| 2015/0269383 A1 | 9/2015 | Lang et al. |
| 2016/0036778 A1 | 2/2016 | Chen et al. |
| 2020/0336316 A1 | 10/2020 | Jain et al. |

OTHER PUBLICATIONS

PCT/US2019/058324 Invitation to Pay Additional Fees dated Dec. 27, 2019.
PCT/US2019/058324 International Search Report and Written Opinion dated Feb. 25, 2020.
Co-pending U.S. Appl. No. 16/742,631, filed Jan. 14, 2020.

* cited by examiner

AUTHORIZATION WITH A PRELOADED CERTIFICATE

BACKGROUND

Computer security requires authorizing, authenticating, and checking the integrity of an entity making requests. In general, computer security involves checking each action for three things: whether the principal's claimed identity is authentic; whether the request is actually one the principal made; and whether the principal is authorized. There are many different ways to check for identity, including passwords, certificates, tokens, and biometric data. Authorization can be done using many different types of rules, such as permission bits, user tables, roles and role bindings, or firewall rules. Security rules may be defined to control various actions such as which resources can be accessed and what actions can be performed on those resources. For example, security rules may govern which files can be accessed, which tables or table columns the user can access in the database, which queries it can run in a database, which network nodes a user can access, or which REST resources the user can access on an API server.

It is often a laborious process to authenticate users, especially if those users are remote users. Authentication may be slow, as it might require looking up permissions in a remote database. In addition, there is not a standard way or unified way to implement authorization policies, because rules vary in different environments and different uses. Also, authorization happens for almost every user request at different levels. Moreover, there are also various different ways to authenticate a device.

With the fast development of IT, the trend towards public cloud, the move to micro-services, as well as new application delivery and orchestration mechanisms (e.g., Docker® containers) have created new challenges for protecting resources and providing authorization. Traditional approaches such as using access control lists (ACLs), or policies to govern what was allowed in and out of an endpoint may not be well adapted to such applications. For instance, micro-services are provided by breaking down applications into several internal micro-services that can each be individually scaled, secured and evolved. This allows for micro-service reuse, modularity of architecture, and the independence of evolution as well as of upgrades (apart from improving the agility of upgrades). These micro-services endpoints may be implemented for other micro-services to interact with, and may not be required to know the end-to-end architecture, resulting in a complex labyrinth of inter-application interactions that is difficult to secure.

SUMMARY

Traditionally, authorization is performed each time a requesting entity requests to perform an action to a resource on a resource server. The process of authorization may require the resource server to check the principal's permissions on a policy database for each request resulting in an inefficient process. This process can be further made inefficient when the policy database is not local to the resource server, and must be contacted over a network.

In light of the above, it is desirable to provide a method and system for an improved or unified computer authorization. In particular, the methods and systems are desired to provide authorization without necessity of local authorization information (e.g., policy database, permission, etc), without necessity of a trusted third-party entity, or penalties associated with remote authorization. The disclosed method and system addresses the above mentioned needs and provides advantages over traditional authorization methods.

Accordingly, in one aspect, methods for authorizing actions on one or more resources are provided. The method may comprise: receiving, at a resource node, one or more requests for performing an action on one or more resources held by the resource node and a certificate including one or more security attributes; verifying, with aid of one or more processors, the one or more security attributes from the certificate, and dispatching the one or more requests to one or more resources based on the resource information included in the one or more security attributes; and performing one or more actions on the one or more resources based on the actions included in the one or more security attributes.

In some embodiments, the certificate is issued by a certificate authority. In some cases, issuing the certificate comprises: receiving the certificate signing request from a requesting entity; verifying, by accessing a policy database, that the requesting entity is authorized to perform one or more actions on one or more resources; and returning to the requesting entity a signed certificate with one or more security attributes including resource information and the one or more actions. In some cases, issuing the certificate further comprises: sending a certificate signing request to a third-party certificate authority; and receiving a signed certificate from the third party certificate authority.

In some embodiments, the certificate further comprises an identity of the requesting entity and an issuant. In some cases, the certificate further comprises a time bound for performing the one or more actions.

In some embodiments, a security attribute comprises a name of a resource, a permitted action, and an address for the resource within a resource node. In some cases, the permitted action comprises one or more members selected from a group consisting of create, read, update, delete, execute, and write. In some cases, the identity of the requesting entity and the issuant are used for authentication check.

In some embodiments, a resource is selected from a group consisting of a database table, a REST endpoint, and a remote function call. In some cases, a resource is a selected portion or part of a database or a REST endpoint.

In some embodiments, the certificate is a standard x509v3 certificate. In some cases, the one or more security attributes is embedded in the Subject Alternative Name (SAN) field of the certificate.

In some embodiments, the resource node and the requesting entity are in a cloud environment, a mobile environment or in a hybrid environment. In some embodiments, the method further comprises sending an approval message if the requesting entity is authorized to perform the one or more actions on the one or more resources.

In another aspect, systems for authorizing actions on one or more resources are provided. The system comprises: an agent running on a resource node, wherein the agent is configured to: receive, from a principal node, one or more requests for performing an action on one or more resources held by the resource node and a certificate including one or more security attributes; verify the one or more security attributes from the certificate; and dispatch the one or more requests to one or more resources based on the resource information included in the one or more security attributes; and a certificate authority configured to issue and provision the certificate to the principal node.

In some embodiments, the certificate authority is provided on a management controller. In some embodiments, the management controller further comprises a policy database.

It shall be understood that different aspects of the invention can be appreciated individually, collectively, or in combination with each other. Various aspects of the invention described herein may be applied to any of the particular applications set forth below or for any other types of the network traffic management/security system disclosed herein. Any description herein concerning the computer security or authorization may apply to and be used for any other computer security or authorization situations. Additionally, any embodiments disclosed in the context of the computer security or authorization system are also applicable to the methods disclosed herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principals of the invention are utilized, and the accompanying drawings of which:

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Certain Definitions

Unless otherwise defined, all technical terms used herein have the same meaning as commonly understood by one of ordinary skill in the art to which this invention belongs.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" where used herein to means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Embodiments of the invention may be used in a variety of applications. Some embodiments of the invention may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, a wireless communication station, a wireless communication device, a wireless access point (AP), a modem, a network, a wireless network, a local area network (LAN), a virtual local area network (VLAN), a wireless LAN (WLAN), a metropolitan area network (MAN), a wireless MAN (WMAN), a wide area network (WAN), a wireless WAN (WWAN), a personal area network (PAN), a wireless PAN (WPAN), a virtual private network (VPN), a storage area network (SAN), a frame relay connection, an Advanced Intelligent Network (AIN) connection, a synchronous optical network (SONET) connection, devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, or the like.

It is noted that various embodiments can be used in conjunction with one or more types of wireless or wired communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, ZigBee™, or the like. Embodiments of the invention may be used in various other devices, systems, and/or networks.

While portions of this disclosure, for demonstrative purposes, refer to wired and/or wired communication systems or methods, embodiments of the invention are not limited in this regard. As an example, one or more wired communication systems, can utilize one or more wireless communication components, one or more wireless communication methods or protocols, or the like.

Methods and systems of the present disclosure allows for improved authorization of users (principals) that is convenient by issuing the users (principals) a certificate with certain security attributes. Methods and systems of the present disclosure may allow for security control with improved flexibility. For instance, policies can be applied at different levels with improved flexibility. For example, authorization to access services, workloads, resources and various operations may be granted at granular level. In another example, instead of allowing access to all the APIs (application programming interfaces), access may be authorized at per API level. For instance, engineers may have read access to one API, whereas human resource may have write access to another API even when both APIs are exposed by the same application.

Certificates

Certificates are traditionally used to create secure connections between nodes of a network. For example, trusted certificates can be used to create secure connections to a server via the Internet. A certificate is essential in order to circumvent a malicious party which happens to be on the route to a target server which acts as if it were the target. Such a scenario is commonly referred to as a man-in-the-middle attack. The client uses the certificate authority (CA) certificate to authenticate the CA signature on the server certificate, as part of the authorizations before launching a secure connection. A certificate authority or certification authority (CA) is an entity that issues digital certificates. A digital certificate may certify the ownership of a public key by the named subject of the certificate. This allows others (relying parties) to rely upon signatures or on assertions made about the private key that corresponds to the certified public key. A CA acts as a trusted third party—trusted both by the subject (owner) of the certificate and by the party relying upon the certificate.

Certificates are used in cryptographic technologies such as Transport Layer Security (TLS) and its predecessor, Secure Sockets Layer (SSL). TLS and SSL are cryptographic protocols or encryption protocols used to provide secure connections over the Internet. SSL utilizes X.509 certificates, certificate authorities, and a public key infrastructure to verify relation between a certificate and its owner, as well as to generate, sign, and administer the validity of certificates. In some embodiments of the invention, existing certificates such as X.509 v3 may be utilized for authorization and/or authentication. Alternatively or in addition to, certificates having system defined formats or proprietary certificates may be utilized.

Certificate-Based Authorization

The provided certificate-based authorization mechanism allows for the entity controlling the resource only need to validate the authenticity of a certificate for authorization. The provided certificate-based authorization mechanism is advantageous over traditional authorization method by eliminating the need for local authentication or authorization information, such as a policy database or permissions. The provided certificate-based authorization mechanism may also eliminate need for an online trusted third party during the authorization process, or not incurring performance penalties associated with remote authorization.

The certificate-based authorization mechanism also confers additional advantages. In some cases, the certificate-based authorization mechanism may use existing certificates such as standard X.509 v3 certificates without introducing extra cost. The certificate-based authorization mechanism is generic that it can be used for various types and any number of resources, for various types of operations at different levels for any granularity. The certificate-based authorization mechanism can be applied to various types of communication such as human-to-machine and machine-to-machine communications. The certificate-based authorization mechanism works for various deployment scenarios including but not limited to, on-prem, cloud, hybrid, and mobile deployment scenarios. The certificate-based authorization mechanism works across administrative boundaries. For example, it allows delegation to trusted entities, and shared resource management. In addition, the certificate-based authorization mechanism may include embedded time bounds on privileges granted to the user for additional layer of security.

Figure 1A:
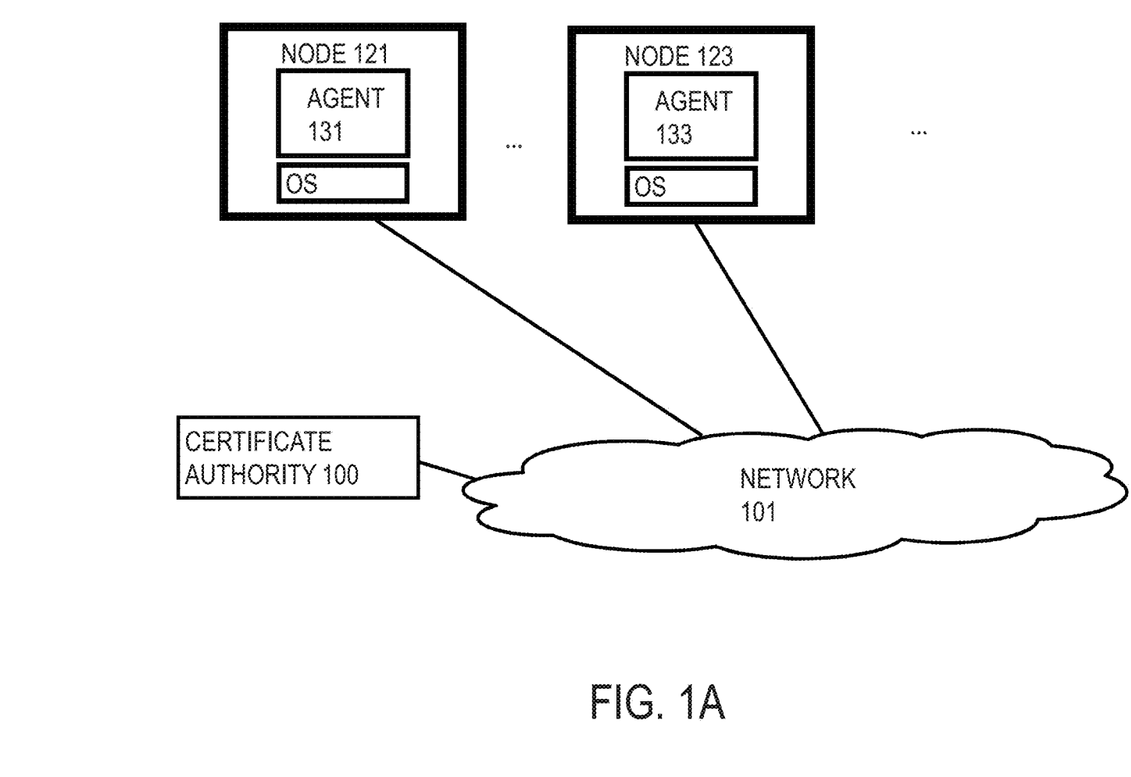
FIG. 1A is a block diagram illustrating example connections between nodes over a network, in accordance with embodiments of the invention.

FIG. 1A is a block diagram illustrating example connections between nodes 121, 123 over a network 101, in accordance with embodiments of the invention. The plurality of nodes 121, 123 may be equipped with the provided authorization mechanism so as to provide protection and security to access resources on the nodes.

Network 101 may be a telecommunications network that allows computers to exchange data. For example, in network 101, networked computing devices pass data to each other along data connections (e.g., network links). Data can be transferred in the form of packets. The connections between nodes may be established using either cable media or wireless media. The network 101 may, for example, include a wireless network, a local area network (LAN), a virtual local area network (VLAN), a wireless LAN (WLAN), a metropolitan area network (MAN), a wireless MAN (WMAN), a wide area network (WAN), a wireless WAN (WWAN), a personal area network (PAN), a wireless PAN (WPAN), a virtual private network (VPN), a storage area network (SAN), a frame relay connection, an Advanced Intelligent Network (AIN) connection, a synchronous optical network (SONET) connection, devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards. The network can be used in conjunction with one or more types of wireless or wired communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, ZigBee™ or the like.

In an example, the network 101 may be Internet that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network.

A node can be any network entity, component or communication device. For instance, a node can be a physical server, process (e.g., function running on a virtual machine), external network, a virtual partition, legacy mainframes, modem, hub, bridge, switch, router, server, workstation, desktop computer, laptop computer, tablet, mobile phone, desk phone, wearable device, or other network or electronic device. A virtual partition may be an instance of a virtual machine (VM), sandbox, container, or any other isolated environment that can have software operating within it. In some example embodiments, nodes can include a server, hypervisor, process, or switch configured with virtual tunnel node (VTEP) functionality which connects an overlay network with network fabric. The overlay network may allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NV03), and Stateless Transport Tunneling (STT), can provide a traffic encapsulation scheme which allows network traffic to be carried across L2 and L3 networks over a logical tunnel. Such logical tunnels can be originated and terminated through VTEPs. The overlay network can host physical devices, such as servers, applications, node groups, virtual segments, virtual workloads, etc. In addition, nodes can host virtual workload(s), clusters, and applications or services, which can connect with network fabric or any other device or network, including an internal or external network. For example, nodes can host, or connect to, a cluster of load balancers or a node group of various applications.

The example illustrated in FIG. 1A can be a virtual environment. The one or more nodes may be virtual machines. The described system or method may be used to perform authorization and/or authentication of principals for performing operations on resources hosted on the nodes. Details about the authorization and authentication are described later herein.

The depicted virtual environment may comprise one or more physical hosts hosting one or more nodes. A physical host may be a computing device that acts as computing server such as a blade server or bare-metal server. In some cases, a physical host may be part of a cloud computing environment. By way of further non-limiting examples, a physical host can host different combinations and permutations of virtual and container environments.

The nodes 121, 123 may be capable of controlling access to resources on the nodes or authorizing actions that are permitted to be performed to resources on the nodes. The nodes may be capable of approving or rejecting a request for performing an operation/action (e.g., access resources) with aid of an agent 131, 133. In some cases, an agent 131, 133 may run on the node. The agent may be configured to operate in conjunction with a certificate authority 100 to facilitate a certificate-based authorization. The agent may be configured for managing security of a node. In some cases, the agent may verify if the certificate is a valid certificate based on the digital signature included in the certificate. In some embodiments, the agent may execute a security action (e.g., approve a request, deny a request, dispatch a request to a resource) according to the security attributes embedded in the certificate.

The agent may be local to the node or to the network of the node. For example, the agent can be running on the network interface device such as NIC. Alternatively or additionally, the agent may reside on any component of the node such as virtual partition, hypervisor, physical server, switch, router, gateway, or other independent systems or devices operably or communicatively coupled to the node. As mentioned elsewhere herein, the virtual partition may be an instance of a virtual machine (VM), sandbox, container, virtual switch, or any other isolated environment that can have software operating within it. The agent may be implemented by software, hardware or a combination of both.

The certificate authority 100 may be implemented by any suitable systems such as a server. The certificate authority 100 as described elsewhere herein may issue certificate in response to a request submitted by the agent. In some cases, the certificate authority 100 may be verified by another certificate authority (e.g., root certificate authority).

Figure 1B:
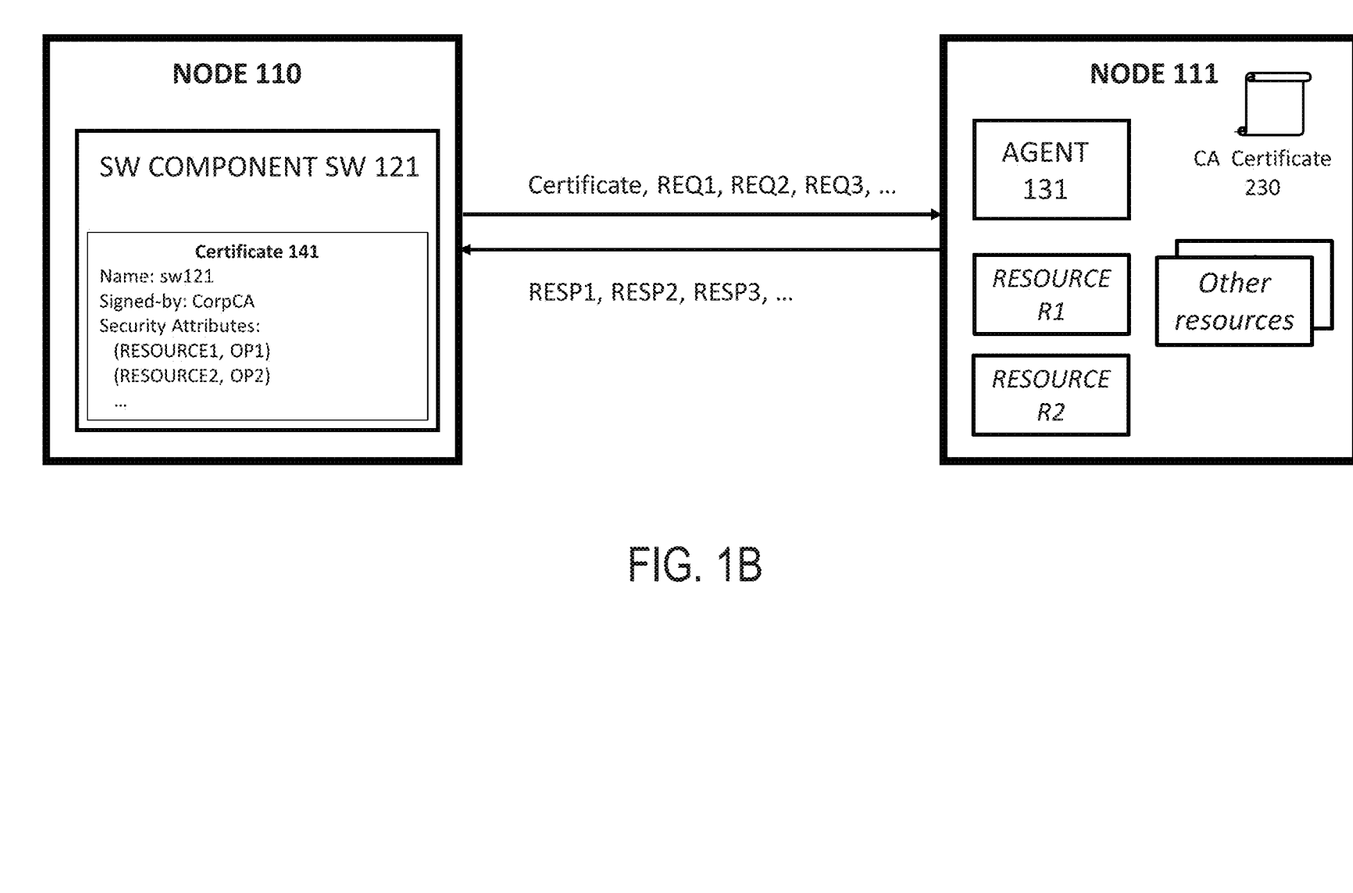
FIG. 1B illustrates example of a principal node and a resource node.

FIG. 1B shows an example of a principal node 110 and a resource node 110. The principal node 110 and/or the resource node 111 can be of the type described in FIG. 1A. FIG. 1B illustrates a communication between the two nodes.

A principal node may refer to a node hosting principals or through which principals may request an access to a given resource hosted on the resource node or performing an action. A principal may also be referred to as a requesting entity which is interchangeably used throughout the specification. Actions or operations taken on resources hosted on the resource node can be requested by various requesting entities (e.g., a user, a client, a server, a process, etc.). A principal is an identifier of such an entity. Various types of principals can be used in various embodiments depending on, for example, the type entity being identified. A principal can include, for example, name (e.g., user name), a security identifier, addresses (e.g., a MAC address, a TCP/IP address, etc.), keys and/or tokens (e.g., a SecurID token, USB token, Bluetooth token, etc.) and/or a physical identifier (e.g., a fingerprint or retina scan), and the like. At a network level a principal can be, for example, an IP address and at an application level, a principal can be a username/password pair or a public/private key pair. In some cases, for a principal identified by the provided system, a unique security identifier (SID) by which the principal can be identified within the system may be generated. In alternative cases or in addition to, the identifier of the principal can be the name of the principal.

A resource node may refer to a node providing resources. A node can be both a principal node and a resource node.

A certificate may be associated with a principal such as individual people, computers, services, computational entities such as processes and threads, network entity, component or communication device as described above. A certificate may be associated with software, an application, an operating system, a virtual machine, a user, an organization, a host and other entities. In some cases, a certificate may be associated with one principal. In some cases, a principal may be associated with one or more certificates.

A certificate may, in some cases, include an identity of the requesting entity such as name and/or identifier of an application, as well as security attributes. Alternatively, a certificate may only contain security attributes. A certificate may be stored in a memory unit. A certificate may be stored on a stationary machine or accessible by a computer unit. A certificate may be stored in a portable device. For instance, a certificate may be stored in a smartcard that can be carried by a user for gaining access to a building, a property, an account, and various others.

A security attribute may relate to authorized actions can be performed. In some cases, the security attributes may comprise the name of the resource to which the action is performed and the name of the action or operation. For example, security attributes may indicate which files can be accessed, which tables or table columns the user can access in the database, which queries it can run in a database, which network nodes a user can access, or which REST resources the user can access on an API server. A certificate may comprise one or more security attributes.

In the illustrated example, the principal node 110 may include a principal such as software component 121. The software component 121 may include a certificate 141. The resource node 111 may include an agent 131 and one or more resources. The resources can be software objects. Resources may comprise software applications, database tables, functions, text forms, files, or other objects as described elsewhere herein. In some cases, resources may interact with other entities using HTTP requests.

The software component 121 on the principal node 110 may request to perform an action on a resource hosted on the resource node 111. An action may be reading a file, writing data to a file or database, uploading a file, deleting a file or a record, or other actions.

The certificate 141 may provide authentication and authorization information of the software component to the resource node. The information may be contained in one or more fields. In some embodiments, the fields may include the name of the software application requesting to perform an action to one or more of the resources, the company signing the certificate, and one or more security attributes.

A security attribute may relate to authorized actions can be performed. In some cases, the security attributes may comprise the name of the resource to which the action is performed and the name of the action or operation. In some cases, the certificate may comprise time bounds on permitted operations or access granted to the user or requesting entity. The certificate may be sent with the action request from the principal node 110, and inform the resource node 111 of the permissions held by the software application 121.

The security attribute may be embedded in any field of the certificate. For example, as part of the X.509 certificate standard, the security attribute may be included in the Subject Alternative Name (SAN) field of the certificate. The security attribute can be embedded in any other standard extensions and non-standard extensions of X.509 certificate. For example, the extension may contain an "Object ID" (OID) that identifies the party that has defined the extension. The security attribute and other information may be included in the certificate in a format defined by the system.

Below is an example of a certificate. As can be seen in the example, the security attributes "URI:authz://sales/database/customers/table/us-region/column/credit-card-number?access=read-only, URI:authz://sales/app/crm/function/create-customer?name=joe,type=consumer, URI:authz://it/host/serverl/file/etc/password?access=read-write" are inserted into the Subject Alternative Name (SAN) field.

Certificate:
Data:
Version: 3 (0x2)
Serial Number: 5e:19:e8:34:78:98:26:aa:d7:ba:00:6a:cf:
69:a2:cc
Signature Algorithm: ecdsa-with-SHA256
Issuer: CN=EnterpriseCA
Validity
Not Before: Aug. 10 17:04:05 2018 GMT
Not After: Aug. 10 17:04:05 2019 GMT
Subject: CN=EnterpriseUser
Subject Public Key Info:
Public Key Algorithm: id-ecPublicKey
EC Public Key:
pub:
04:56:2b:f5:2a:fb:88:72:d9:9f:7e:bc:08:2d:3f:
92:2e:ac:84:6c:f2:0d:8b:a7:e1:80:be:47:9b:25:
05:f7:63:fc:11:07:1c:f9:2b:26:40:c5:45:d6:e6:
90:f7:b8:7f:a4:46:50:07:00:d3:8b:18:23:05:3b:
d9:5c:54:db:02
ASN1 OID: prime256v1
X509v3 Key Usage: critical
Digital Signature, Key Encipherment, Data Encipherment
X509v3 Extended Key Usage:
TLS Web Client Authentication, TLS Web Server Authentication
X509v3 Basic Constraints: critical
CA:FALSE
X509v3 Subject Key Identifier: 38:0B:15:78:E9:FLEF:
66:E3:91:33:9C:B2:5F:3E:EC:5A:64:D5:9D:50:DD:
6B:71:38:D1:EC:F7:56: B8:F0:C3
X509v3 Authority Key Identifier:
keyid:01:02:03
X509v3 Subject Alternative Name:
URI:authz://sales/database/customers/table/us-region/
column/credit-card-number?access=read-only, URI:
authz://sales/app/crm/function/create-
customer?name=joe,type=consumer, URI:authz://it/
host/serverl/file/etc/password?access=read-write Signature Algorithm: ecdsa-with-SHA256

The resource node 111 holds the resources on which the principal node 110 performs actions. The agent 131 on the resource node 111 may be configured to authorize a request by examining the certificate. The agent may, for example, receive requests from the principal node 110 and distribute them to the appropriate resources, as designated from reading the information contained in the certificate 141. In some cases, in order to dispatch requests to the corresponding resources (as identified in the security attributes or requests), the agent 131 may have the addresses of all of the resources on the resource node listed locally in a table for quick lookup. The resource table may be stored with or accessible to the resource node. In other embodiments, the agent may contact a list of resource addresses hosted elsewhere, such as on a network. Once the resource address is looked up, the agent may forward the request.

The resource node or the agent 131 on the resource node may validate or verify the certificate. In some cases, the resource node 131 may retain a copy of a certificate by the same signer as that of the certificate 131 issued by the principal node 110. This allows the resource 111 to verify that the certificate issued by the principal node 110 is valid.

The instructions, media for conveying such instructions, computing resources for executing them, and other structures for supporting such computing resources are means for providing the functions described in these disclosures.

Figure 2:
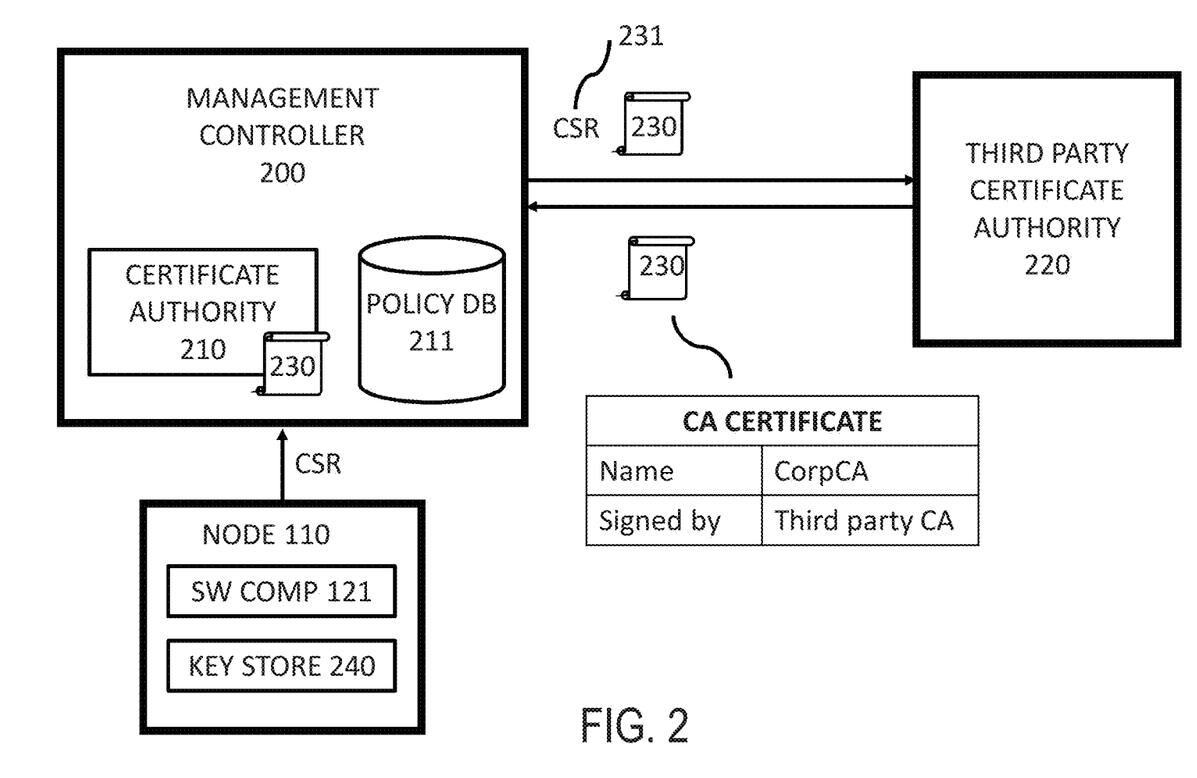
FIG. 2 schematically illustrates a system for provisioning certificates.

FIG. 2 shows a block diagram for provisioning certificates. As shown in the example, a certificate authority (CA) 210 may be implemented by a management controller 200. The certificate authority 210 may be configured for issuing a certificate for the software node 121. In an example, Secure Sockets Layer (SSL) which is a well-known cryptographic protocol may be used to secure communications over networks such as the Internet. Cryptographic protocols such as SSL are often based on public key cryptographic systems, such as the RSA (Rivest, Shamir and Adelman) encryption algorithm. For a traditional RSA-based SSL session, the two sides of a connection agree upon a "pre-master secret" (PMS) which is used to generate the parameters for the remainder of the session. Typically, the two sides use RSA asymmetric encryption to establish the pre-master secret without exchanging the actual value in plaintext. In operation, the SSL client generates the pre-master secret and encrypts it with the SSL server's publicly available RSA key. This generates an encrypted pre-master secret (ePMS), which is then provided to the SSL server. The SSL server has a private decryption key, which is then used to decrypt the encrypted premaster secret. At this point, both the client and the server have the original pre-master secret and can use it to generate the symmetric key used for actual encrypted and secure data exchange.

In some cases, a management controller or certificate authority (CA) may have a CA certificate and keypair used for communication with nodes. When a new management controller or certificate authority is provisioned, the certificate authority 210 may generate a CA certificate and CSR (Certificate Signing Request) 231 and send the latter to a third party CA 220. The third party CA 220 may be a trusted CA such as a root CA, a CA a level higher in the certificate chain than the CA 210, or any other CA that may be further certified by another CA. In some cases, the CSR 231 preferably may contain a pair of identifiers, such as a unique serial number for the management controller or the CA 210, as well as a serial number for the CSR version. The third party CA 220 may sign the CSR and send the certificate 230 to the CA 210. In some cases, the third party CA 220 may send a message containing the certificate details (serial number pair) to other intermediate CA that may communicate with the CA 210.

In some embodiments, the CA may have a certificate revocation mechanism for revoking a certificate. The CA may employ any suitable revocation mechanism. For instance, the CA may issue Certificate Revocation Lists (CRLs) to revoke authorization before the certificate expires. A certificate revocation list (CRL) is a list of digital certificates that have been revoked by the issuing certificate authority (CA) before their scheduled expiration date and should no longer be trusted. In some cases, the CA may use an Online Certificate Status Protocol (OCSP) responder to respond to queries regarding the validity of a certificate.

The CA certificate 230 signed by the third party certificate authority may comprise information related to the CA that signed the certificate (e.g., signed by Third part CA) and the certified entity (e.g., intermediate CA 210 with name Venice.dcl). In the case when SSL is used, the certificate may comply with the X.509 standard. In some embodiments, an end of a connection such as a node may comprise a key repository such as a key store 240 for storing private keys of the certificate authority 210. The private key may be obtained from the CA 210 corresponding to the CA certificate. In some cases, the key repository may also contain one or more certificates (e.g., TLS/SSL certificate) issued for each workload or node, one or more private keys associated with the TLS/SSL certificate, or certificates request that to be signed by the intermediate CA. In some cases when mutual authentication is required, the key repository may further store certificates issued to another node or workload.

The key repository may reside on a memory unit. The memory unit may be local to the node 110. In some cases, the memory unit may be a component of a network interface infrastructure such as NIC of the node 110. In some embodiments, the NIC may comprise a write port or communication interface allowing for memory read/write operations. For instance, the communication interface may support packets written to or read from the memory unit such as an external memory (e.g., high bandwidth memory (HBM) of a host device) or an internal static random access memory (SRAM). The communication interface may employ any suitable protocol such as Advanced Microcontroller Bus Architecture (AMBA) Advanced extensible Interface (AXI) protocol. AXI is a bus protocol for a high-speed/high-end on-chip bus protocol and has channels associated with read, write, address, and write response, which are respectively separated, individually operated, and have transaction properties such as multiple-outstanding address or write data interleaving. The AXI interface may include features that support for unaligned data transfers using byte strobes, burst based transactions with only start address issued, separate address/control and data phases, issuing of multiple outstanding addresses with out of order responses, and easy addition of register stages to provide timing closure.

The management controller 200 issues signed certificates to the principal node 110. The management controller may comprise a certificate authority 210 and a policy database 211. A node may send to the management controller 200 a certificate signing request with the security attributes for the resources it needs. The attributes are then validated in the policy database 211 to make sure that the node is actually authorized to perform those actions. The management controller 200 may be implemented in hardware, software, or a combination of both. There may be one or more management controllers.

The certificate authority 210 can be a component of the management controller that issues and signs certificates. The certificate authority 210 signs certificates if the software component is determined to be authorized to access the resources. For instance, the certificate authority 210 may check the policy database 211 to determine if the software component is authorized to access one or more sources. In some instances, the certificate authority may be an intermediate CA. The intermediate CA may be verified by a trusted root certificate authority. There may be additional intermediate CAs between the certificate authority and the root certificate authority, forming a chain of trust.

The policy database 211 may comprise a mapping of software components to the resources they are allowed to access. In some cases, the mapping information may be stored in a table that contains a list of permissions, such as read, write, delete, upload, or other permissions. The policy database may be updated manually. Alternatively or in addition to, the policy database may be updated automatically in response to events. For example, policies can be added to the policy database upon detecting a VM or a container instantiated on a node (either by a human operator or a scheduler) or a new user account created in a user directory (e.g., Lightweight Directory Access Protocol server). In some instances, permissions may be added to the policy database manually. For example, a user of a software application may have to fill out a form and be granted permissions by an administrator. These permissions may also be set when the system is first initialized. The policy database may be a relational database or a NoSQL database.

The third party certificate authority ensures certificates issued by the management controller 200 are valid. When a new management controller or certificate authority is provisioned, the certificate authority may send a CA certificate and CSR (certificate signing request) and send the latter to a third party CA. The third party CA may be a trusted CA such as a root CA, a CA a level higher in the certificate chain than the CA 210, or any other CA that may be further certified by another CA. In some cases, the CSR preferably may contain a pair of identifiers, such as a unique serial number for the management controller or the CA 210, as well as a serial number for the CSR version. The third party CA may send a message containing certificate details (serial number pair) to another intermediate CA that may communicate with the CA. Before creating a CSR, the applicant first generates a key pair, keeping the private key secret. The CSR contains information identifying the applicant (such as a distinguished name in the case of an X.509 certificate) which must be signed using the applicant's private key. The CSR also contains the public key chosen by the applicant. The CSR may be accompanied by other credentials or proofs of identity required by the certificate authority, and the certificate authority may contact the applicant for further information.

In some embodiments, a certification request may comprise the certification request information, a signature algorithm identifier, and a digital signature on the certification request information. The certification request information may contain the significant information, including the public key. The signature by the requester prevents an entity from requesting a bogus certificate of someone else's public key. The private key is needed to produce, but it is not part of, the CSR.

Figure 3:
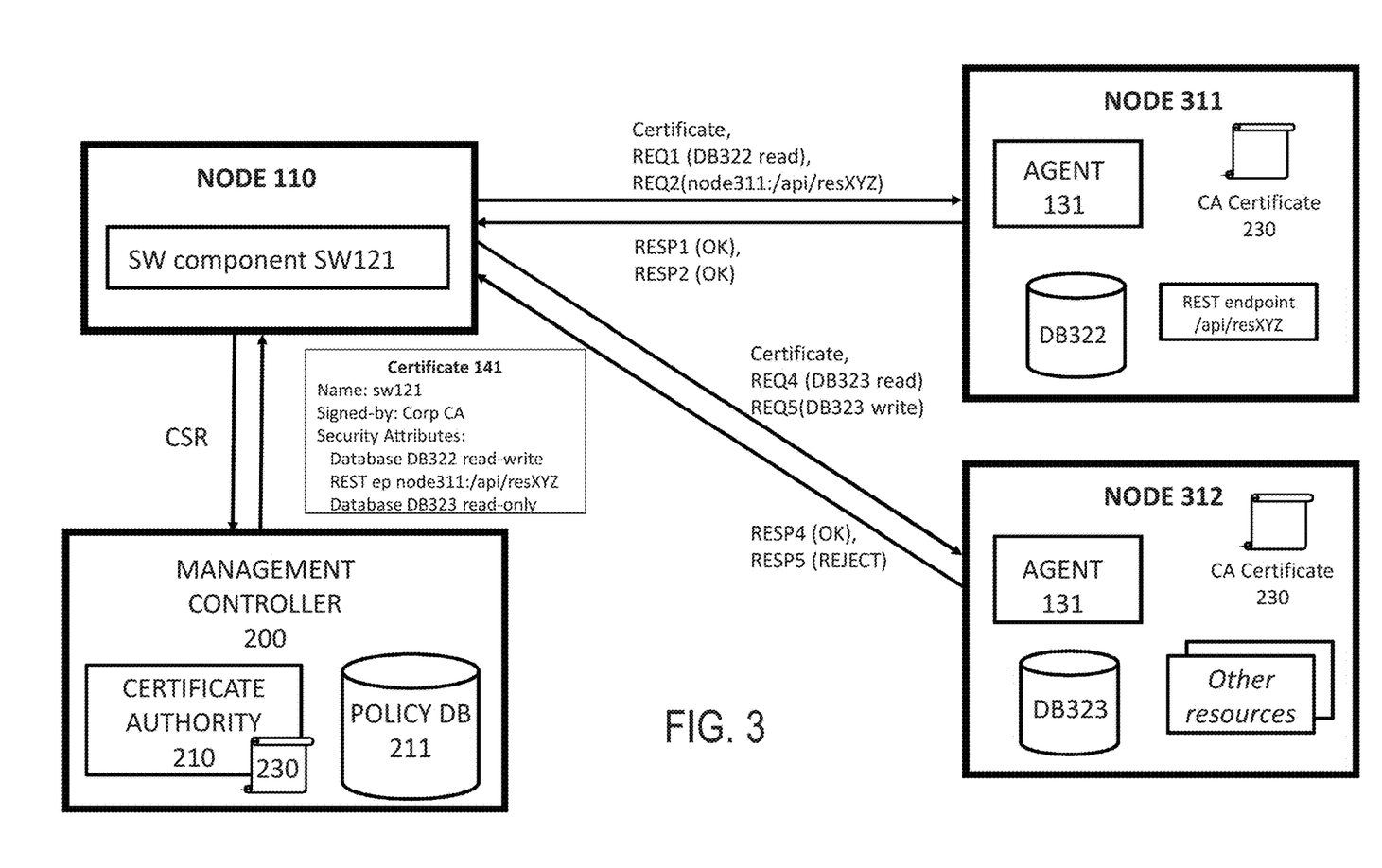
FIG. 3 shows a block diagram illustrating message flow through the system.

FIG. 3 shows a block diagram illustrating message flow through the system. First, the principal node 110 may send a CSR to the management controller, asking the management controller to issue it a certificate. The management controller 200 may check the policy database to verify which permissions the software application 121 on the principal node 110 holds. The management controller 200 then issues, via the certificate authority 210, a certificate to the principal node.

A certificate may be sent along with one or more requests. In some cases, a certificate may include a plurality of security attributes that the certificate can be used to authorize a plurality of requests.

In the illustrated example, the principal node then communicates with two resource nodes 311 and 312. The principal node may send a first certificate along with two requests to the resource node 311. One of the requests is for a database read and the other one is an API call to the rest node XYZ. The first certificate may comprise security attributes indicating that the requestor has permission to perform both of these actions.

Upon receiving the certificate, the agent 131 may parse the security attributes and determine if the requested actions to be taken are permitted. Upon determining the actions are authorized to perform, the agent may dispatch each request to the corresponding resource. In some cases, the agent 131 may return response messages (e.g., OK messages), indicating that the principal node 110 is authorized to perform those actions.

In some cases, the agent may be configured to verify if the requested actions are permitted by examining the security attributes in the certificate. In some cases, only permitted request is passed to the corresponding resource. For example, the principal node may send the certificate to a second resource node 312 with another two requests for resources residing on the second principal node 312. The first request is for a read to database 323. The second request is for a write to database 323. The certificate does not include the permission to write to DB 323, but it does include permission to read it. Thus, the agent may dispatch the first request to DB 323 and issue an OK message for the read request and a rejection message for the write request.

Figure 4:
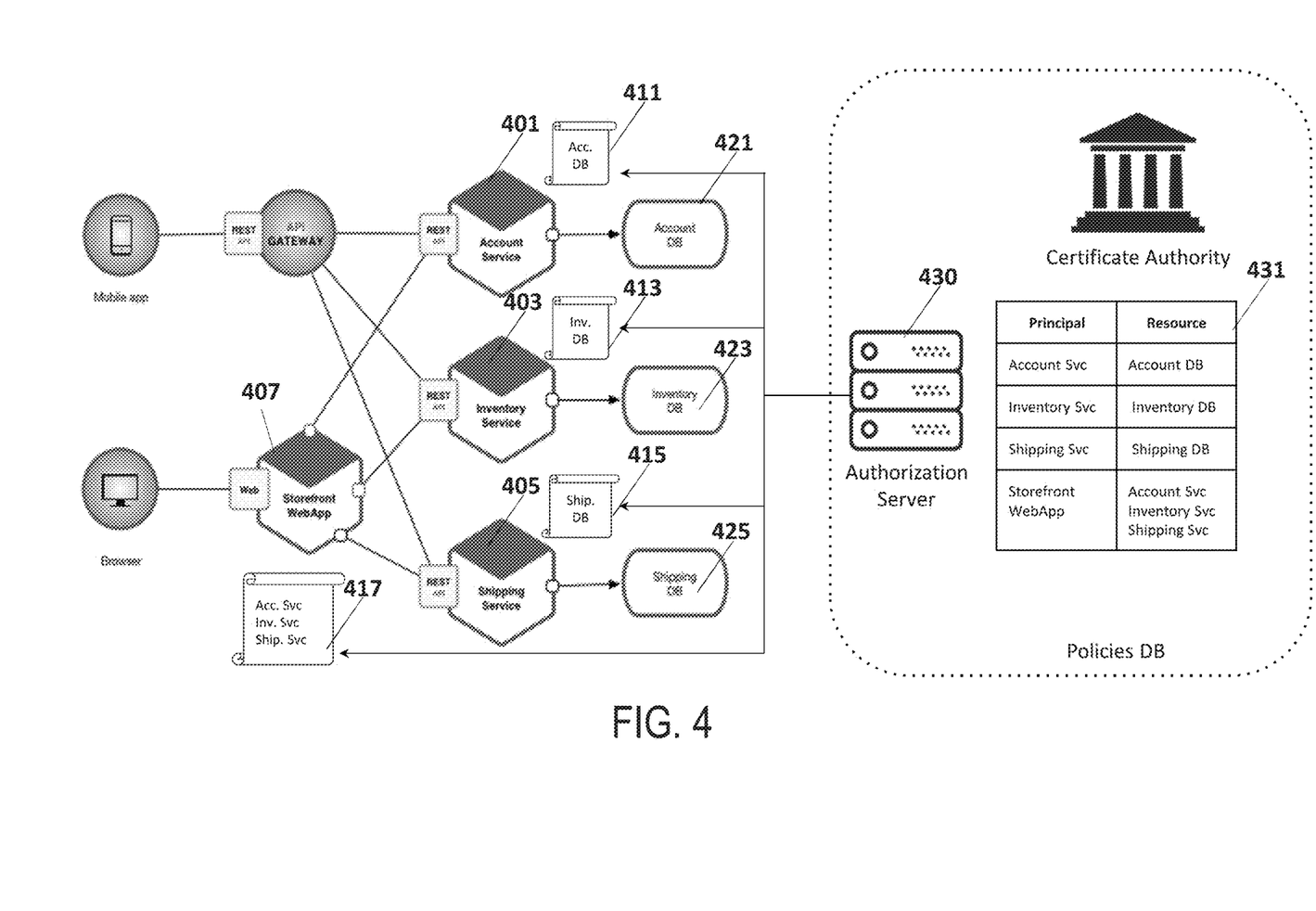
FIG. 4 shows an example of applying the certificate-based authorization mechanism in a micro-service environment.

FIG. 4 shows an example of applying the certificate-based authorization mechanism in a micro-service environment. As described above, the certificate-based authorization provides a unified authorization plane regardless of the resources, types of actions, or deployment scenarios. As shown in the example, the principals may be REST APIs implementing account service 401, inventory service 403, shipping service 405 and storefront Web App 407. A certificate may be sent to a resource node along with a request to access to resources/services or perform an action on a resource. In the illustrated example, separate certificates 411, 413, 415 may be sent to the resource node from the principal nodes 401, 403, 405 respectively for authorization. The resource node may dispatch the requests to the corresponding resources such as the account database 421, inventory database 423, and shipping database 425 upon determining the actions are permitted. The may be done by examining the security attributes in the certificate. In some cases, a certificate 417 comprising principal node identity or service identity may be used for authentication. Alternatively or in addition to, the identity information may also be included in the certificates 411, 413, 415.

The certificates may be issued or managed by a certificate authority. In some cases, the certificate authority is hosted on an authorization server 430. The authorization server may access a policy database 431 for generating certificates as described above. The certificate authority can have one or more processors and at least one memory for storing program instructions. The processors can be part of the network interface system or device. Alternatively or additionally, the processors can be part of the host system. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the certificate authority can be implemented in hardware components (e.g., ASICs, special purpose computers, or general purpose computers), software or combinations of hardware and software.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for authorizing actions on one or more resources, the method comprising:
    (a) receiving, at a resource node, one or more requests for performing an action on one or more resources held by the resource node and a certificate embedded with one or more security attributes, wherein the one or more security attributes comprise information about one or more resources allowed to be accessed and information about a permitted action associated with the one or more resources allowed to be accessed;
    (b), verifying, with aid of one or more processors at the resource node, the one or more security attributes from the certificate, and dispatching the one or more requests to the one or more resources based on the information about the one or more resources embedded in the certificate; and
    (c) authorizing one or more actions on the one or more resources based at least in part on the one or more requests and the information about the permitted action embedded in the certificate.

2. The method of claim 1, wherein the certificate is issued by a certificate authority.

3. The method of claim 2, where issuing the certificate comprises:
    receiving the certificate signing request from a requesting entity;
    verifying, by accessing a policy database, that the requesting entity is authorized to perform one or more actions on one or more resources; and
    returning to the requesting entity a signed certificate with one or more security attributes including resource information and the one or more actions.

4. The method of claim 3, wherein issuing the certificate further comprises:
    sending a certificate signing request to a third-party certificate authority; and
    receiving a signed certificate from the third party certificate authority.

5. The method of claim 1, wherein the certificate further comprises an identity of the requesting entity and an issuant.

6. The method of claim 5, wherein the certificate further comprises a time bound for performing the one or more actions.

7. The method of claim 1, wherein the one or more security attributes further comprise information about a name of a resource, and an address for the resource within a resource node.

8. The method of claim 1, wherein the permitted action comprises one or more members selected from a group consisting of create, read, update, delete, execute, and write.

9. The method of claim 5, wherein the identity of the requesting entity and the issuant are used for authentication check.

10. The method of claim 1, wherein the one or more resources are selected from a group consisting of a database table, a REST endpoint, and a remote function call.

11. The method of claim 10, wherein the one or more resources comprise a selected portion of a database or a REST endpoint.

12. The method of claim 1, wherein the certificate is a standard x509v3 certificate.

13. The method of claim 12, wherein the one or more security attributes is embedded in the Subject Alternative Name (SAN) field of the certificate.

14. The method of claim 1, wherein the resource node and the requesting entity are in a cloud environment or a mobile environment.

15. The method of claim 1, wherein the resource node and the requesting entity are in a hybrid environment.

16. The method of claim 1, further comprising sending an approval message if the requesting entity is authorized to perform the one or more actions on the one or more resources.

17. A system for authorizing actions on one or more resources comprising:
    an agent running on a resource node, wherein the agent is configured to: receive, from a principal node, one or more requests for performing an action on one or more resources held by the resource node and a certificate embedded with one or more security attributes, wherein the one or more security attributes comprise information about one or more resources allowed to be accessed and information about a permitted action associated with the one or more resources;
    verify the one or more security attributes from the certificate; and
    dispatch the one or more requests to the one or more resources based on the information about the one or more resources embedded in the certificate; and a certificate authority configured to issue and provision the certificate to the principal node.

18. The system of claim 17, wherein the certificate authority is provided on a management controller.

19. The system of claim 18, wherein the management controller further comprises a policy database that is remote to the resource node.

20. The method of claim 1, wherein (b)-(c) are performed without accessing a policy database.

* * * * *

UNITED STATES PATENT AND TRADEMARK OFFICE
CERTIFICATE OF CORRECTION

| | | |
|---|---|---|
| PATENT NO. | : 10,944,576 B2 | |
| APPLICATION NO. | : 16/173441 | |
| DATED | : March 9, 2021 | |
| INVENTOR(S) | : Schiattarella et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 107 days.

Signed and Sealed this
Thirty-first Day of January, 2023

Katherine Kelly Vidal
*Director of the United States Patent and Trademark Office*